United States Patent Office 3,064,532
Patented Nov. 20, 1962

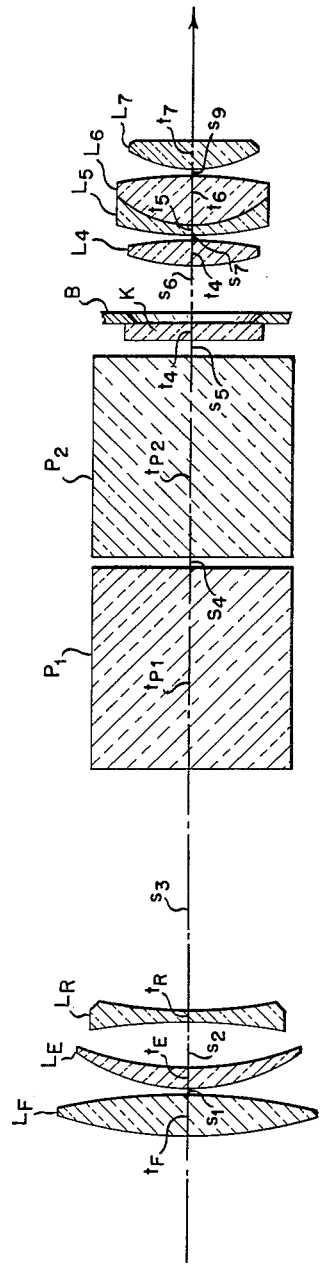

3,064,532
HIGH SPEED OPTICAL SYSTEM FOR TELESCOPES
Edmund Jakob Lescher, Yonkers, and Albrecht Wilhelm
Tronnier, New York, N.Y., assignors to Farrand Optical Co., Inc., New York, N.Y., a corporation of New York
Filed Mar. 2, 1960, Ser. No. 12,431
10 Claims. (Cl. 88—57)

The present invention relates to high speed optical systems for telescopes, suitable for construction into both monocular and binocular instruments, and provides improved systems of both types having special advantages under conditions of poor illumination.

High speed telescopic systems of various types have been already proposed and have been widely commercialized in the form of prism binoculars. Even when constructed for moderate magnifications of six and eightfold, these instruments become bulky, heavy, and difficult to handle if provided with apparent field angles of some 50°. The weight of these instruments is in many cases so great that continuous observation therewith can be made only with a support such as a tripod or the like. These known telescopic systems become particularly heavy when made to provide, in addition to a high relative aperture, a wide angle field, since for this latter purpose they must have large and heavy erecting prisms to handle the large field angles.

Since, for a given magnification to be achieved, the speed or relative aperture of a telescope depends on the diameter of the entrance pupil of the objective, and hence on the diameter of the objective lens elements themselves, these prior art telescopic systems have been provided with relatively long focal lengths for the objectives, in order to hold the relative aperture of the objective lenses as low as possible so that the aperture-dependent aberrations might likewise be held to low values. A further consequence of such a choice of long focal length objectives has been that for a given diameter of the field stop only a relatively small angular field could be imaged. Even within this limited field the extra-axial aberrations of the usual telescopic objectives limit substantially the obtainable image quality. Such telescope designs have therefore the disadvantage of a small useful field of view in conjunction with the long tube length required by the long focal length of their objectives.

It has been heretofore proposed to reduce the weight of such long telescopes by minimizing the size of the erecting prism system between the objective and its focal plane. To this end proposals have been made to dispose the negative element of a telephoto objective at the location of the prismatic erecting system, and particularly between the Porro prisms thereof. Alternatively, an auxiliary lens system has been suggested, comprising a plano-convex lens introduced in front of the erecting prisms and a plano-concave lens as a compensator introduced behind them, as in Swiss Patent No. 237,467. Further, it has been proposed to provide the telescope with an image erecting system of particularly low weight as in U.S. Patent No. 2,558,236.

In order to minimize the weight of the telescope it has also been proposed to construct the telescope housing of minimum volume as in German Patents Nos. 749,350 and 749,523. It has also been proposed to employ, in place of the usual doublet-type objective, multi-element objectives of complicated construction including spherical or sphero-chromatic correcting cemented surfaces in order to achieve lower zonal values for the spherical aberration at one or more wave lengths. In this way it was intended to make these objectives useful at higher relative apertures, i.e. with reduced focal lengths, without accepting a corresponding degradation in the image quality. In this class may be mentioned the three-element cemented apochromatic objective of British Patent No. 782,211 and the three-element partly cemented semi-apochromatic objective of U.S. Patent No. 2,663,222. However even these complicated systems, which depend in part on special glasses, achieve only relative apertures of some $f/4$ to $f/6$, and hence require focal lengths some 4 to 6 times the necessary objective diameter. The three-element partly cemented apochromatic objective of British Patent No. 782,213 provides a high image performance at a relative aperture of $f/3.5$, but only over a small field, and therefore likewise requires a long equivalent focal length to cover sharply a given wide field diameter in the image plane. In consequence the telescope tubes remain long and relatively heavy.

According to the present invention instead, telescopes are provided of very compact and light construction, easy to handle and of high image quality over a large field of view. This improvement is achieved without resort to complicated multi-element lenses, and on the new constructional basis instead of the normal makeup of all usual telescopic systems. The invention provides telescopic systems having an objective of high relative aperture and high image quality. The large relative aperture at high image quality achieved by the invention for the objective permits shortening and lightening of the telescope instrument, for given objective diameter and overall magnification, since it entails a shortening of the objective focal length and hence of the eyepiece focal length as well, the magnification being given by the ratio of the objective and eyepiece focal lengths. Reduction of the eyepiece focal length means a reduced field stop diameter, for the same field angle, and hence reduced weight and dimensions for the erecting prisms.

The invention will now be described in further detail with reference to the accompanying drawings in which:

FIG. 4 is a diagrammatic axial section through the telescopic system of FIG. 2, the optical axis being shown straightened out and the indicated thickness of the erecting prisms being the length of the folded optical axis through the reflecting prisms of the instrument.

Figure 1:
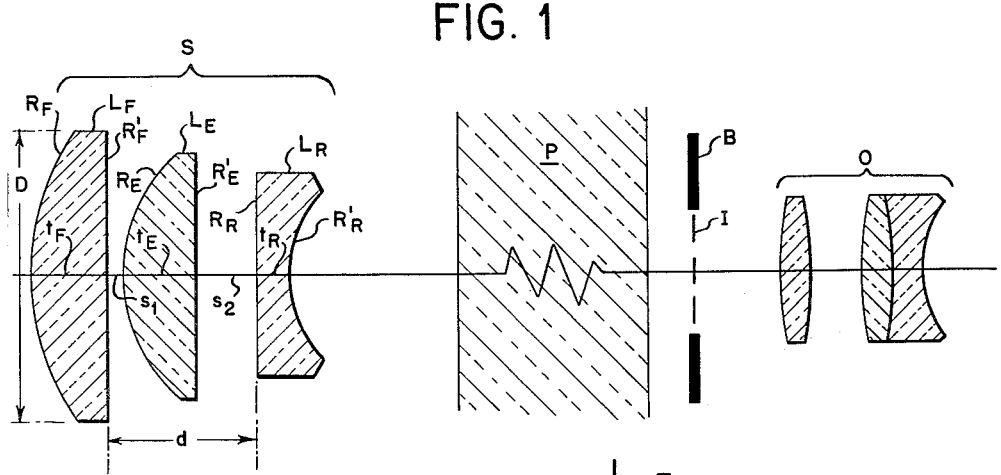
FIG. 1 is an axial section through a telescopic system according to the invention, the erecting system being shown diagrammatically.

From the object to the eye of the observer the telescope of FIG. 1 comprises an objective S, an image erector system P, an optional field-stop B at the focal plane I (e.g. image plane) of the objective, which diagram may support a reticle in the objective focal plane, and finally an ocular O between the focal plane of the objective and the eye of the observer. The ocular possesses a power $\Phi_0$ between 35 and 80 diopters. The long conjugate side of the system is hence to the left in FIG. 1 and the short conjugate end to the right. The erecting system P is indicated diagrammatically only in this figure by means of two planes perpendicular to the system axis with a refracting medium between them.

The objective S takes the form of a built-up, plural-element lens of meniscus exterior shape and of positive equivalent power $\phi_S$, whose exterior surfaces $R_F$ and $R'_R$ are concave toward the image plane. The objective comprises a convergent front element $L_F$, a divergent rear element $L_R$, and a convergent element $L_E$ between them. The relative aperture of the objective, i.e. the ratio of the diameter D of its front element to its focal length $f_S$, is between ½ and ¼. Of course, $f_S = 1/\Phi_S$. The first front surface $R_F$ of element $L_F$ and the rear surface $R'_R$ of element $L_R$, both concave toward the field-stop B, impose on the objective its characteristic form and properties. Elements $L_F$ and $L_R$ are separated by a spacing $d$ into which is inserted the inner element $L_E$, which is convergent in form and effect. The successive spacings of element $L_F$, $L_E$ and $L_R$ are respectively denoted $s_1$ and $s_2$. The front surface $R_E$ of element $L_E$ presented to the long conjugate side of the system is of strong positive power, the strongest in positive power in the objective.

According to the invention the front element $L_F$ has a very strong positive sum of surface powers amounting to more than 75% of the equivalent refractive power $\Phi_S$, without exceeding 275% of $\Phi_S$. $L_F$ therefore effects a strong ray convergence in the direction of the inner element $L_E$. Consequently the convex front surface $R_E$ of element $L_E$ is traversed by the aperture rays at very low angles of incidence and it is to this front surface $R_E$ that the invention assigns the strong convergent power required for achievement of the large relative aperture permitted by the invention. In view of these low angles of incidence, such strong positive power can be given to the surface $R_E$ without the loss of image quality, which at higher angles of incidence would come from large spherical zonal errors in the wide aperture bundles of such a high speed system.

The curvature of the exterior meniscus surfaces $R_F$ and $R'_R$ of the objective is such that its Gardner shape factor lies, in absolute value, between two-and-a-third and infinity. The Gardner shape factor $\sigma$ is the ratio of the sum to the difference of the radii of curvature of the front and rear surfaces of the lens. Thus, referring to FIG. 1 wherein the objective S comprises front, middle and rear elements $L_F$, $L_E$ and $L_R$ respectively, the front surface of element $L_F$ having a front surface of radius $R_F$ and the rear element $L_R$ having a rear surface of radius $R'_R$, the absolute value of the Gardner shape factor $\sigma$ of the objective is given by the equation $$\sigma = \left| \frac{R'_R + R_F}{R'_R - R_F} \right|$$

According to another feature of the invention the last exterior surface $R'_R$ of the objective possesses such strong divergent power that the ratio of the absolute value of the power of this surface to the equivalent power $\Phi_S$ of the objective lies betwen 0.50 and 3.33.

The inner element $L_E$ is disposed between the convergent front element $L_F$ and the divergent element $L_R$ with its strongly curved front surface of radius $R_E$ convex toward the long conjugate side of the system. The sum $\phi_E$ of the powers of the front and rear surface $R_E$ and $R'_E$ of this element $L_E$ is greater than 40% but less than 175% of the equivalent objective power $\Phi_S$. Consequently the front surface $R_E$ of the inner element is the most strongly convergent surface of the entire objective, its power $\phi_{RE}$ lying between 1.25 and 2.75 times the equivalent power $\Phi_S$ of the objective.

The power $\phi$ of a surface is as usual defined by the quotient of the difference of the indices of refraction of the media separated by the surface divided by the radius of that surface. The power of the lens element is the sum of its surface powers. Hereinafter, the symbol $\phi$ with a compound subscript comprising the letter R and a letter identification of a lens element will denote the power of the front surface of that element whereas the symbol $\phi$ with a compound subscript comprising the letter R' and an identification of a lens element will denote the power of the rear surface of that element. The symbol $\phi$ with a single letter subscript comprising an identification of a lens element will denote the sum of the surface powers of that element. The symbol $\phi$ with a single number subscript denotes the power of the front or rear surface of a lens element in the ocular, according to whether that symbol $\phi$ is unprimed or primed.

Algebraically, the foregoing properties of the objective of the telescope of the invention may be summarized as follows:

$$2D < f_S < 4D \tag{1}$$

$$2.33 \leq \sigma \leq \infty \tag{2}$$

$$0.75\Phi_S < \phi_F < 2.75\Phi_S \tag{3}$$

$$0.5 < \frac{|\phi^{R'}R|}{\phi_s} < 3.33 \tag{4}$$

$$0.40\Phi_S < \phi_E < 1.75\Phi_S \tag{5}$$

$$1.25\Phi_S < \phi_{RE} < 2.75\Phi_S \tag{6}$$

The powers of the surfaces of the individual elements in the objective are arranged and distributed to achieve a high and uniform sharpness of image over the entire field of the telescope. To this end the individual lens surface powers are so dimensioned and arranged that their combined sum for the three element meniscus lies between 0% and 75% of the equivalent objective power $\Phi_S$. Algebraically:

$$0\Phi_S < |\phi_F + \phi_E + \phi_R| < 0.75\Phi_S \tag{7}$$

The prisms of the erector system make no contribution to these power sums since the prisms are bounded solely by plane surfaces whose power contribution is zero.

The new telescopic system of the invention is to possess not only a high speed objective of high on-axis image quality in accordance with condition (1) but is also to possess a very high image performance over an unusually wide field angle. Over this complete angular field the observer is permitted to see even the finest details clear and sharp because of the achievement by the invention of an image-formation with very low residual aberrations even in the off-axis field. In place of the usual objectives of two and three elements which are afflicted with astigmatism and distortion and in some cases with significant comatic errors, the invention employs a form of construction derived from the null lens of von Hoegh as the progenitor of all anastigmats. For a description of the von Hoegh null lens see A. Gleichen, Lehrbuch der Goemetrischen Optik, Teubner, Leipzig 1902, pages 483 to 485.

In contrast to the classical null lens however, which is useable only at very low speeds with relative apertures of between $f/20$ and $f/30$ or lower, the imaging system of the invention is of the built-up meniscus type, characterized by relations (1) to (7).

By adherence to these criteria the invention provides an optical system for telescopes whose objective is of meniscus shape and in which the distribution of surface powers is such that there is achieved a very low residual astigmatism in the imagery over a wide field angle and also a very good flattening of the field, without introduction of increased comatic errors in the ray bundles of wide aperture in the off-axis field.

The two-element and three-element objectives of the prior art of moderate relative aperture, such as the Fraunhofer doublet and the cemented doublet, and the cemented triplet, may be regarded substantially as biconvex or as plano-convex components. In view of this general form and in view of the fact that they contain for correction of spherical aberration a pair of adjacent surfaces (sometimes cemented) which have together a negative power and are spherically over-correcting, these prior art lenses produce strongly distorted images afflicted with severe astigmatism and curvature of field. Within this image both the amount of curvature and the astigmatic difference between the sagittal and tangential image surfaces increase with field angle. In contrast, the invention provides a telescope whose lens system closely approximates the null lens. With the division according to the invention of the objective meniscus into three air spaced elements, there is achieved an improvement in image performance in the lateral portion of the field. Further, by means of the power distribution prescribed by the invention, there is achieved an optical system of high relative aperture and also a very favorable small value for the residual zonical aberrations. This makes it possible, with the aid of objectives of short focal length, to provide to the telescope a short, compact and easily handled construction with very high image quality, all without the necessity of resorting to means which would render the telescope economically impracticable as is the case for example of the apochromatic triplet telescope objectives of H. D. Taylor which possess a high image performance, but which require extremely steep lens curvatures.

According to a further feature of the invention contributing to facility of manufacture of a very light weight telescope, the space $d$ between the adjacent vertices of the front and rear elements $L_F$ and $L_R$ of the objective is so proportioned as to lie between 5% and 20% of the equivalent focal length $f_S$ of the objective. It is also highly advantageous so to proportion the individual lens elements that the sum of their axial thicknesses $t_F$, $t_E$ and $t_R$ likewise lies between 5% and 20% of $f_S$. Algebraically these relations may be represented as follows:

$$0.005 \; f_S < d < 0.20 \; f_S \tag{8}$$
$$0.05 \; f_S < t_F + t_E + t_R < 0.20 \; f_S \tag{9}$$

Thus according to the invention there is provided a telescope, for example of the binocular prismatic erecting type, which provides the finest image quality and which at the same time is light and easy to handle, without the employment of either mechanical or optical arrangements which are difficult of construction, the latter often including either thick and steeply curved lens elements, or else lens elements in very large number. As examples of this latter trend, attention may be called to the four-element partially cemented telescope objective disclosed in U.S. Patent No. 2,158,507, and to the four-element telescope objective of U.S. Patent No. 2,620,706, whose elements are cemented together in pairs with the erector system between the front pair and the rear telephoto negative element pair. Attention is likewise called to the five-element telescopic objective of the present author in collaboration with Schneider described by W. Strohmeier in Astronomische Nachrichten, vol. 279, No. 4, 1951, and to the six-element objective system of U.S. Patent No. 2,660,093. This last lens, in spite of its complicated construction with a four-element front component, has a relative aperture of only 1:5.1 so that with a 50 mm. objective diameter a focal length of 255 mm. must be accepted. For such an objective diameter the telescope of the present invention possesses an objective focal length less by from 100 to 110 mm. than the 255 mm. length just referred to.

The telescope according to the invention moreover differs in its purely optical operation from other telescopes employing built-up meniscus objectives, for example from those such as the three-element uncemented objective of Swiss Patent No. 252,384. In this prior art lens the strongly divergent concave rear surface presented to the image plane possesses a surface power more than three and one half times the equivalent power of the objective, whereas in the lens of the present invention the power of the corresponding surface is less than 333% of the equivalent power of the objective. In view of the strong divergent power of its rear surface, the lens of this Swiss patent and similar prior art proposals are afflicted with strong residual zonal aberrations even for moderate relative apertures, in consequence of which they are unuseable at larger apertures. In fact the useable relative aperture of the objective of this Swiss patent is no greater than $f/15$.

In further contrast to the present invention, the lens of this Swiss patent is so constructed that the radius of its front surface possesses the strongest convergent power in the system, amounting to more than two and one-half times the power of the front surface of the inner element. The present invention provides instead that the front surface of the inner element shall possess the strongest positive surface power in the system. This permits a substantial improvement in the variation, with incident ray height, of the zonal values of the aperture aberrations both within and off the axis. This result is impossible of achievement in the systems of the prior art. The same fundamental difference exists between the telescope of the invention and the four-element objective of U.S. Patent No. 2,158,507 in which the last surface of the lens of Example 3 (FIG. 3) has a negative power of more than three-and-a-half times the equivalent power of that lens.

For the manufacture of telescopic systems according to the present invention there may be employed the customary glasses of commerce, an advantage of the invention being that it permits the use of such glasses. Special glasses may of course be used to advantage in order to achieve particular effects or properties, for example glasses of particularly high transparency in selected spectral regions. Indeed there may be employed transparent media other than glass. According to the invention it is also possible to make up any of the objective elements as a cemented pair, as for example for achieving achromatism for more than two wave lengths.

As the telescope of the invention is to be constructed to have a wide field of view, the erector system thereof is preferably made of prisms composed of glasses of high index. In such cases moreover the reflecting surfaces of the prisms are preferably left unsilvered and without other applied reflecting coating. It is also possible to design the system to include supplementary elements such as positive or negative lenses either in the vicinity of the erector system or in the vicinity of the objective focal plane. In any case a fine correction of the objective may be achieved by providing that the entire imaging system and such supplementary elements together are provided with fine correction for optimum imaging.

As an example of the telescope of the invention as schematically illustrated in FIG. 1 there may be taken an eight power system of 48 mm. objective diameter. This telescope has a prismatic erecting system indicated at P and a semi-wide angle ocular O, shown as of Kellner type, whose focal length $f_O$ is 19.3 mm. (corresponding to a power of 51.81 diopters) and whose apparent field of view amounts to 64°. The objective S has a useful diameter D of 48 mm. and has a focal length $f_S$ of 8 times 19.3 or 154.4 mm. Its relative aperture is 1:3.2. The telescope thus has in the object space a field angle of 8° and has an exit pupil of 48/8 or 6 mm.

Figure 2:
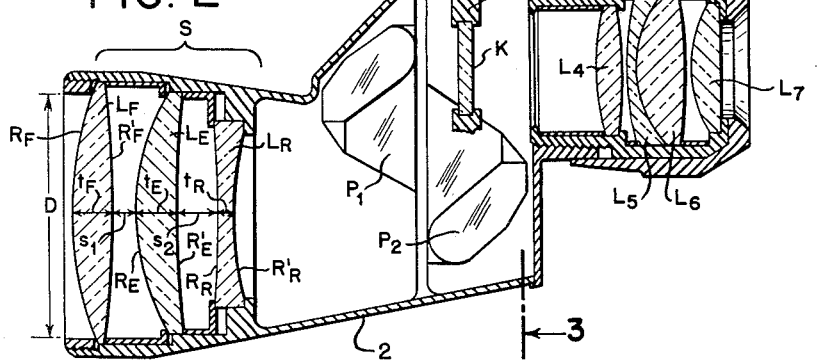
FIG. 2 is an axial section through a telescopic system according to the invention, which may be one half of a prism binocular, including a prismatic erecting system.
Figure 3:
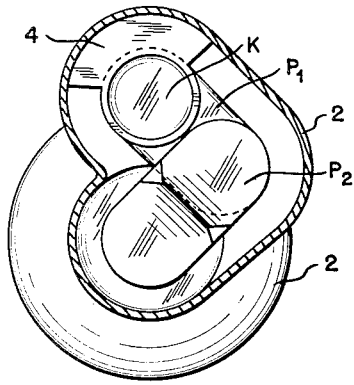
FIG. 3 is a sectional view taken on the line 3—3 of FIG. 2.

FIGS. 2 to 4 illustrate an embodiment of the invention in the form of one half of a prism binocular. By way of example, the prism binocular of FIG. 2 may be constructed of seven power with an objective S whose useful or free diameter is 50.7 mm., to possess an imaging system whose relative aperture lies between $f/2$ and $f/3$ whereas the example described in the preceding paragraph with respect to FIG. 1 has a relative aperture between $f/3$ and $f/4$.

The system of FIG. 2 to be described is hence a 7 x 50 instrument, according to the common form of designation. It includes a 60° ocular O of modified Erfle type having a focal length of 21.00 mm. (or a power $\Phi_O$ of 47.6190 diopters) and an apparent field of view of 60.2°. The objective S has a focal length of 147.0 mm. and a relative aperture of 1:2.899. The field of view of the instrument at the objective amounts to 8.6° and the exit pupil has a diameter of 7.2 mm. The objective has an equivalent power $\Phi_S$ of +6.8027 diopters. In accordance with the principles of the invention hereinabove set forth, the imaging system is built up as follows:

The biconvex front element $L_F$ has a surface power sum $\Phi_F$ of 10.79655 diopters. The meniscus shaped inner element $L_E$ which follows it has a surface power sum $\Phi_E$ of 5.04250 diopters. Its front surface $R_E$ has a power $\Phi_{RE}$ of 13.03030 diopters, this being the most strongly convergent surface of the objective, in accordance with the properties of the invention already described. In this example this surface has not only the strongest convergent power of any single surface, but indeed has a power greater than the surface power sum of the front element $L_F$. The rear element $L_R$ is of biconcave shape, as is desirable for the achievement of high speed with low zonal errors, and has its rear surface $R'_R$, concave toward the image plane, of strong divergent power. The surface power sum $\Phi_R$ of $L_R$ is in this example of $-12.51303$ diopters, of which $-7.67850$ diopters are the contribution $\Phi_{R'R}$ of the concave rear surface $R'_R$ of that element. This surface power thus amounts to 112% of the equivalent power of the complete objective. The Gardner shape factor of the objective S of FIG. 2 has an absolute value $\sigma$ of 29.3.

As indicated in FIG. 2, the new telescope construction of the invention makes possible an imaging system of high relative aperture having lens elements of low thickness and hence of light weight, even though capable of handling large aperture ray bundles. At some cost in relative aperture these thicknesses can of course be further reduced. Such a reduction will in practice rarely be necessary however since in the example above described in detail the thicknesses of the lens elements have the following low values:

$t_F = 8.4$ mm.
$t_E = 4.80$ mm.
$t_R = 2.60$ mm.

The sum of the three lens thicknesses of the objective in this example is therefore 15.80 mm., which amounts to only 10.75% of the equivalent focal length of the objective and to only 31.16% of the diameter of the entrance pupil. The separation $d$ between the two exterior elements $L_F$ and $L_R$ is 14.85 mm. on the axis, or 10.10% of the equivalent focal length of the objective, the spacing $s_2$ between the inner element and the rear element thereby amounting to 9.60 mm.

The rear surface $R'_F$ of the front element $L_F$ and the front surface $R_E$ of the inner element $L_E$ bound a convergent air lens of axial thickness $s_1$. The rear surface $R'_E$ of the inner element $L_E$ and the front surface $R_R$ of the rear element $L_R$ bound a strongly divergent air lens whose axial thickness is $s_2$. The convergently operating air lens between $L_F$ and $L_E$ has a very favorable effect in reducing extra axial imaging errors and the zonal residuals thereof. The divergent air lens between $L_E$ and $L_R$ contributes primarily to reduction of the on-axis aberrations. In this way, without the expense or encumbrance of supplementary optical elements there is provided a very well balanced image system providing much improved uniformity in image quality over the whole field of view. At the same time the feature of the invention set forth in relation (6) above is taken into account by providing to the whole objective system the surface power sum of 3.32602 diopters, amounting to almost exactly 48.9% of the equivalent power $\Phi_S$ of the objective.

As can be seen from FIGS. 2 and 3, a reticle plate K may be provided in the focal plane of the objective. This reticle plate may be provided with a spherical surface on the side presented toward the objective. This surface serves to locate properly the axial position of the exit pupil of the instrument without impairing the image qualities of the system, this spherical surface being in the immediate vicinity of the objective focal plane. The reticle K is supported from the telescope housing 2 by means of a web 4. FIGS. 2 and 3 further illustrate the erecting system, comprising two Porro prisms $P_1$ and $P_2$ disposed in the usual arrangement.

The eyepiece includes elements $L_4$, $L_5$, $L_6$ and $L_7$ numbered from front to rear, elements $L_5$ and $L_6$ being cemented together. The makeup of the telescopic system of FIGS. 2 to 4 may be set forth in tabular form as follows:

| Element | Radii, mm. | Thickness, mm. | Spacing, mm. | Index | Abbe Number |
|---|---|---|---|---|---|
| $L_F$ | $R_F = +90.307$<br>$R'_F = -90.307$ | $t_F = 8.40$ | $s_1 = 0.45$ | 1.4875 | 70 |
| $L_E$ | $R_E = +37.413$<br>$R'_E = +61.031$ | $t_E = 4.80$ | $s_2 = 9.60$ | 1.4875 | 70 |
| $L_R$ | $R_R = -133.974$<br>$R'_R = +84.352$ | $t_R = 2.60$ | $s_3 = 48.30$ | 1.6477 | 34 |
| $P_1$ | The prism and reticle surfaces are plane and hence of zero power. | $t_{P1} = 40.30$ | $s_4 = 1.50$ | 1.6210 | 36 |
| $P_2$ | | $t_{P2} = 40.30$ | $s_5 = 3.98$ | 1.6210 | 36 |
| Reticle plate K | | $t_K = 3.00$ | $s_6 = 11.43$ | 1.523 | 58 |
| $L_4$ | $R_4 = +98.78$<br>$R'_4 = -95.85$ | $t_4 = 5.20$ | $s_7 = 0.40$ | 1.620 | 60 |
| $L_5$ | $R_5 = +104.70$<br>$R'_5 = +17.22$ | $t_5 = 2.20$ | $s_8 = 0$ | 1.766 | 28 |
| $L_6$ | $R_6 = +17.22$<br>$R'_6 = -47.50$ | $t_6 = 10.20$ | $s_9 = 0.40$ | 1.621 | 58 |
| $L_7$ | $R_7 = +20.65$<br>$R'_7 = $ plano | $t_7 = 5.50$ | | 1.600 | 60 |

In terms of surface powers, the data of the preceding table may be written as follows:

| Element | Surface Powers, dptr. | Thickness, mm. | Spacing, mm. | Index | Abbe Number |
|---|---|---|---|---|---|
| $L_F$ | $\phi_{RF} = +5.398275$<br>$\phi'_{RF} = +5.398275$ | $t_F = 8.40$ | $s_1 = 0.45$ | 1.4875 | 70 |
| $L_E$ | $\phi_{RE} = +13.03030$<br>$\phi'_{RE} = -7.98780$ | $t_E = 4.80$ | $s_2 = 9.60$ | 1.4875 | 70 |
| $L_R$ | $\phi_{RR} = -4.83453$<br>$\phi'_{RR} = -7.67850$ | $t_R = 2.60$ | $s_3 = 48.30$ | 1.6477 | 34 |
| $P_1$ | The prism and reticle surfaces are plane and hence of zero power | $t_{P1} = 40.30$ | $s_4 = 1.50$ | 1.6210 | 36 |
| $P_2$ | | $t_{P2} = 40.30$ | $s_5 = 3.98$ | 1.6210 | 36 |
| Reticle plate K | | $t_K = 3.00$ | $s_6 = 11.43$ | 1.523 | 58 |
| $L_4$ | $\phi_4 = +6.27657$<br>$\phi'_4 = +6.46844$ | $t_4 = 5.20$ | $s_7 = 0.40$ | 1.620 | 60 |
| $L_5$ | $\phi_5 = +7.31614$<br>$\phi'_5 = -44.48316$ | $t_5 = 2.20$ | $s_8 = 0$ | 1.766 | 28 |
| $L_6$ | $\phi_6 = +36.06272$<br>$\phi'_6 = +13.07368$ | $t_6 = 10.20$ | $s_9 = 0.40$ | 1.621 | 58 |
| $L_7$ | $\phi_7 = +29.05569$<br>$\phi'_7 = \pm 0$ | $t_7 = 5.50$ | | 1.600 | 60 |

While the invention has been described herein in terms of a number of preferred embodiments, the invention itself is not limited thereto, the scope of the invention being rather set forth in the accompanying claims.

I claim:

1. A telescopic optical system comprising an objective, an ocular, and erecting means between the objective and ocular, the ocular having a refractive power between substantially 35 and 80 diopters, the objective comprising a front convergent element, a middle convergent element and a rear divergent element, the front surfaces of the front and middle elements and the rear surface of the rear element being concave toward the rear, the absolute value of the ratio of the sum of the front radius of the front element and the rear radius of the rear element to the difference of said radii being at least 2.33 and the equivalent focal length of the objective being between substantially two and four times the diameter of the entrance pupil of the objective.

2. A telescopic optical system comprising an objective, an ocular, and image erecting means between them, the ocular having a refractive power between substantially 35 and 80 diopters, the objective comprising a front convergent element, a middle convergent element, and a rear divergent element, the front surfaces of the front and middle elements and the rear surface of the rear element being concave toward the rear, the diameter of the front element lying between substantially 0.25 and 0.5 times the equivalent focal length of the objective, the absolute value of the ratio of the sum of the front radius of the front element and the rear radius of the rear element to the difference between said radii being between 2.33 and infinity, said front convergent element having a positive sum of surface powers between 0.75 and 2.75 times the equivalent power of the objective.

3. A telescopic optical system according to claim 2 in which the absolute value of the power of the rear surface of the rear element of the objective lies between substantially 0.5 and 3.33 times the equivalent power of the objective.

4. A telescopic optical system according to claim 2 in which the sum of the powers of the surfaces of the middle element of the objective lies between substantially 0.4 and 1.75 times the equivalent power of the objective.

5. A telescopic optical system according to claim 2 in which the power of the front surface of the middle element of the objective lies between substantially 1.25 and 2.75 times the equivalent power of the objective.

6. A telescopic optical system according to claim 2 in which the sum of the powers of the surfaces of the three elements of the objective lies between substantially zero and three quarters of the equivalent power of the objective.

7. A telescopic optical system according to claim 2 in which the separation of the front and rear elements of the objective lies between substantially 0.05 and 0.20 times the equivalent focal length of the objective.

8. A telescopic optical system according to claim 2 in which the sum of the axial thicknesses of the three elements of the objective lies between substantially 0.05 and 0.2 times the equivalent focal length of the objective.

9. A telescopic optical system comprising an objective, an ocular, and image erecting means between them, the ocular having a refractive power between substantially 35 and 80 diopters, the objective comprising a front convergent element, a middle convergent element, and a rear divergent element, the front surfaces of the front and middle elements and the rear surface of the rear element being concave toward the rear, the diameter of the front element lying between substantially 0.25 and 0.5 times the equivalent focal length of the objective, the absolute value of the ratio of the sum of the front radius of the front element and the rear radius of the rear element to the difference between said radii being at least 2.33, the absolute value of the power of the rear surface of said rear element lying between substantially 0.5 and 3.33 times the equivalent power of the objective, the sum of the powers of the surfaces of said middle element lying between substantially 0.4 and 1.75 times said equivalent power, the power of the front surface of said middle element lying between substantially 1.25 and 2.75 times said equivalent power, the sum of the powers of the surfaces of said three elements lying between substantially zero and three quarters of said equivalent power, the separation of the front and rear of said elements and the sum of the axial thicknesses of said three elements lying between substantially 0.05 and 0.2 times the equivalent focal length of the objective.

10. A telescope objective comprising a front convergent element, a middle convergent element, and a rear divergent element, the front surfaces of the front and middle elements and the rear surfaces of the rear element being concave toward the rear, the diameter of the front element lying between substantially 0.25 and 0.5 times the equivalent focal length of the objective, the absolute value of the ratio of the sum of the front radius of the front element and the rear radius of the rear element to the difference between said radii being at least 2.33, the absolute value of the power of the rear surface of said rear element lying between substantially 0.5 and 3.33 times the equivalent power of the objective, the sum of the powers of the surfaces of said middle element lying between substantially 0.4 and 1.75 times said equivalent power, the power of the front surface of said middle element lying between substantially 1.25 and 2.75 times said equivalent power, the sum of the powers of the surfaces of said three elements lying between substantially zero and three quarters of said equivalent power, the separation of the front and rear of said elements and the sum of the axial thicknesses of said three elements lying between substantially 0.05 and 0.2 times the equivalent focal length of the objective.

References Cited in the file of this patent

UNITED STATES PATENTS

| 962,920 | Von Rohr | June 28, 1910 |
| 2,846,922 | Kohler | Aug. 12, 1958 |

FOREIGN PATENTS

| 533,057 | Great Britain | Oct. 4, 1939 |

UNITED STATES PATENT OFFICE
Certificate of Correction

Patent No. 3,064,532                                                              November 20, 1962

Edmund Jakob Lescher et al.

It is hereby certified that error appears in the above numbered patent requiring correction and that the said Letters Patent should read as corrected below.

Column 2, line 67, for "$\phi_s$" read —$\Phi_s$—; column 3, line 2, for "$l/\Phi_s$" read —$1/\Phi_s$—; line 5, for "from" read —form—; column 4, line 25, for the first symbol "O" read —0—; column 5, line 28, for "0.005" read —0.05—; column 7, line 3, for "$I_F$" read —$L_F$—; lines 4, 5, 7, 17, and 19, for "$\Phi$", each occurrence, read —$\phi$—.

Signed and sealed this 14th day of May 1963.

[SEAL]

Attest:
ERNEST W. SWIDER,
*Attesting Officer.*

DAVID L. LADD,
                                                                                     *Commissioner of Patents.*